United States Patent
Wolterman (10) Patent No.: US 9,912,802 B2
(45) Date of Patent: Mar. 6, 2018

(54) METHODS, SYSTEMS, AND VEHICLES FOR DISABLING A FUNCTION OF ONE OR MORE MOBILE DEVICES WITHIN A PASSENGER CABIN OF A VEHICLE

(71) Applicant: Toyota Motor Engineering & Manufacturing North America, Inc., Erlanger, KY (US)

(72) Inventor: Michael J. Wolterman, Brighton, MI (US)

(73) Assignee: Toyota Motor Engineering & Manufacturing North America, Inc., Erlanger, KY (US)

(*) Notice: Subject to any disclaimer, the term of this patent is extended or adjusted under 35 U.S.C. 154(b) by 0 days.

(21) Appl. No.: 15/174,430

(22) Filed: Jun. 6, 2016

(65) Prior Publication Data

US 2017/0353597 A1 Dec. 7, 2017

(51) Int. Cl.
  *H04M 1/725* (2006.01)
  *H04W 4/04* (2009.01)
  *H04W 8/22* (2009.01)

(52) U.S. Cl.
  CPC ....... *H04M 1/72577* (2013.01); *H04W 4/046* (2013.01); *H04W 8/22* (2013.01)

(58) Field of Classification Search
  CPC .... H04M 1/72577; H04W 4/046; H04W 8/22
  See application file for complete search history.

(56) References Cited

U.S. PATENT DOCUMENTS

| | | | |
|---|---|---|---|
| 7,474,264 B2 * | 1/2009 | Bolduc | G01S 5/02 342/463 |
| 7,856,203 B2 | 12/2010 | Lipovski | |
| 8,401,578 B2 | 3/2013 | Inselberg | |
| 8,478,237 B1 | 7/2013 | Stenta | |
| 8,594,705 B2 | 11/2013 | Osann, Jr. | |
| 8,644,812 B2 * | 2/2014 | Raviv | H04W 48/04 455/418 |
| 8,670,891 B1 * | 3/2014 | Szybalski | B62D 1/286 701/23 |

(Continued)

OTHER PUBLICATIONS

Clark Insurance, Fatal Attraction II: Your Ideas for Stopping Texting-While-Driving, http://www.clarkinsurance.com/blog/fatalattractioniiyourideasforstoppingtextingwhiledriving/, published Mar. 9, 2016.

*Primary Examiner* — Marisol Figueroa
(74) *Attorney, Agent, or Firm* — Dinsmore & Shohl LLP (57) ABSTRACT

Embodiments of the present disclosure include methods, systems, and vehicles for disabling a function of one or more mobile devices within a passenger cabin of a vehicle. A method of disabling a function of one or more mobile devices within a passenger cabin of a vehicle according to the present disclosure includes determining a number of occupants within the passenger cabin based on one or more occupant sensor output signals output by one or more occupant sensors. A disable message is sent to disable a function of the one or more mobile devices in the passenger cabin when the number of occupants present in the passenger cabin is determined to be one. A disable message is sent to disable a function of only the one or more mobile devices associated with a driver of the vehicle when the number of occupants present in the passenger cabin is determined to be greater than one.

25 Claims, 5 Drawing Sheets

(56) References Cited

U.S. PATENT DOCUMENTS

| | | |
|---|---|---|
| 8,706,143 B1 | 4/2014 | Elias |
| 8,718,536 B2 | 5/2014 | Hannon |
| 8,761,821 B2 | 6/2014 | Tibbitts et al. |
| 9,161,208 B2 | 10/2015 | Inselberg |
| 2008/0009296 A1 | 1/2008 | Han |
| 2009/0149168 A1 | 6/2009 | McLean |
| 2011/0143786 A1 | 6/2011 | Fan et al. |
| 2011/0304446 A1 | 12/2011 | Basson et al. |
| 2013/0035117 A1* | 2/2013 | Litkouhi ............... H04L 67/12 455/456.4 |
| 2013/0072174 A1 | 3/2013 | Enty et al. |
| 2013/0157574 A1 | 6/2013 | Craine |
| 2014/0187219 A1 | 7/2014 | Yang et al. |
| 2014/0256303 A1 | 9/2014 | Jones |
| 2014/0274020 A1* | 9/2014 | Miller ................... H04W 4/046 455/418 |
| 2015/0154711 A1* | 6/2015 | Christopulos ...... G06Q 30/0201 705/7.29 |
| 2015/0256999 A1 | 9/2015 | Doorandish |

* cited by examiner

METHODS, SYSTEMS, AND VEHICLES FOR DISABLING A FUNCTION OF ONE OR MORE MOBILE DEVICES WITHIN A PASSENGER CABIN OF A VEHICLE

TECHNICAL FIELD

Embodiments described herein generally relate to methods, systems, and vehicles for disabling a function of one or more mobile devices and, more specifically, to methods, systems, and vehicles for disabling a function of one or more mobile devices within a passenger cabin of a vehicle.

BACKGROUND

Oftentimes, vehicle users introduce mobile devices (e.g., mobile phones, smartphones, personal digital assistants, dedicated mobile media players, mobile personal computers, laptop computers, etc.) into the passenger cabin of a vehicle when entering the vehicle. It may be desirable to disable functionality of a mobile device within a passenger cabin in some situations, such as to disable the ability of the driver to text message while driving.

Accordingly, a need exists for methods, systems, and vehicles for disabling one or more functions of a mobile device while the mobile device is present within a passenger cabin of a vehicle.

SUMMARY

In one embodiment, a method of disabling a function of one or more mobile devices within a passenger cabin of a vehicle includes determining a number of occupants within the passenger cabin based on one or more occupant sensor output signals output by one or more occupant sensors. A disable message is sent to disable a function of the one or more mobile devices in the passenger cabin when the number of occupants present in the passenger cabin is determined to be one. A disable message is sent to disable a function of only the one or more mobile devices associated with a driver of the vehicle when the number of occupants present in the passenger cabin is determined to be greater than one.

In another embodiment, a system for disabling a function of one or more mobile devices within a passenger cabin of a vehicle is provided. The system includes one or more processors, one or more occupant sensors communicatively coupled to the one or more processors, network interface hardware communicatively coupled to the one or more processors, and one or more memory modules communicatively coupled to the one or more processors. The one or more memory modules store logic that, when executed by the one or more processors, cause the system to: determine a number of occupants within the passenger cabin based on one or more occupant sensor output signals output by the one or more occupant sensors, send a disable message with the network interface hardware to disable a function of the one or more mobile devices in the passenger cabin when the number of occupants present in the passenger cabin is determined to be one, and send a disable message with the network interface hardware to disable a function of only the one or more mobile devices associated with a driver of the vehicle when the number of occupants present in the passenger cabin is determined to be greater than one.

In yet another embodiment, a vehicle configured to disable a function of one or more mobile devices includes a passenger cabin. The passenger cabin includes a driver zone and a passenger zone. Furthermore, the vehicle includes one or more processors, one or more occupant sensors communicatively coupled to the one or more processors, one or more cellular signal sensors communicatively coupled to the one or more processors, network interface hardware communicatively coupled to the one or more processors, and one or more memory modules communicatively coupled to the one or more processors. The one or more memory modules store logic that, when executed by the one or more processors, cause the vehicle to: determine a number of occupants within the passenger cabin based on the one or more occupant sensor output signals output by the one or more occupant sensors, determine the location of the one or more mobile devices within the passenger cabin based on one or more cellular signal sensor output signals output by the one or more cellular signal sensors, send a disable message with the network interface hardware to disable a function of the one or more mobile devices in the passenger cabin when the number of occupants present in the passenger cabin is determined to be one, and send a disable message with the network interface hardware to disable a function of the one or more mobile devices associated with a driver of the vehicle when the number of occupants present in the passenger cabin is determined to be greater than one.

These and additional features provided by the embodiments of the present disclosure will be more fully understood in view of the following detailed description, in conjunction with the drawings.

BRIEF DESCRIPTION OF THE DRAWINGS

The embodiments set forth in the drawings are illustrative and exemplary in nature and not intended to limit the disclosure. The following detailed description of the illustrative embodiments can be understood when read in conjunction with the following drawings, where like structure is indicated with like reference numerals and in which.

DETAILED DESCRIPTION

The embodiments disclosed herein include methods, systems, and vehicles for disabling a function of one or more mobile devices while the one or more mobile devices are within a passenger cabin of a vehicle. Some embodiments include a variety of occupant sensors to determine the number of occupants in the vehicle. Based on the number of occupants, the system will either disable one or more features of all mobile devices detected within the vehicle or will selectively disable one or more features of only mobile devices associated with the driver of the vehicle. In either circumstance, the driver of the vehicle may be substantially prevented from using one or more features of their mobile device, e.g., text messaging. The various methods, systems, and vehicles for disabling a function of one or more mobile devices within a passenger cabin of a vehicle will be described in more detail herein with specific reference to the corresponding drawings.

Figure 1:
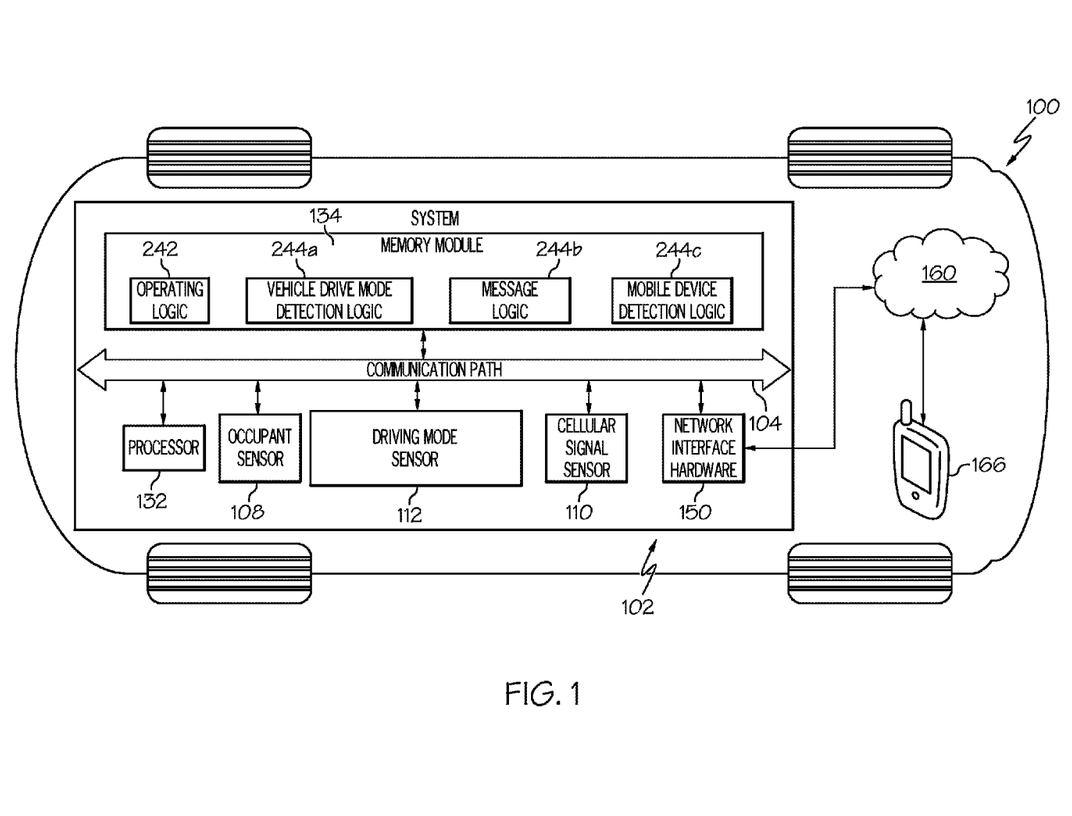
FIG. 1 schematically depicts a system for disabling a function of one or more mobile devices within a passenger cabin of a vehicle, according to one or more embodiments shown and described herein.

Referring now to the drawings, FIG. 1 depicts an embodiment of a vehicle 100 that includes a system 102 for disabling a function of one or more mobile devices 166 within a passenger cabin of the vehicle 100. The system 102 includes a communication path 104, one or more processors 132, one or more memory modules 134, and network interface hardware 150 to communicate with a network 160. The vehicle 100 further includes a plurality of sensors such as one or more occupant sensors 108, one or more driving mode sensors 112, and one or more cellular signal sensors 110. It is noted that, while the vehicle 100 is depicted as an automobile, the vehicle 100 may be any passenger vehicle such as, for example, a terrestrial, aquatic, and/or airborne vehicle. Furthermore, in some embodiments, the vehicle 100 may be an autonomous vehicle.

As described above, the system 102 includes a communication path 104 that provides data interconnectivity between various vehicle modules disposed within the system 102. Specifically, each of the vehicle modules can operate as a node that may send and/or receive data. In some embodiments, the communication path 104 includes a conductive material that permits the transmission of electrical data signals to processors, memories, sensors, and actuators throughout the system 102. In another embodiment, the communication path 104 can be a bus, such as for example a LIN bus, a CAN bus, a VAN bus, and the like. In further embodiments, the communication path 104 may be wireless and/or an optical waveguide. Components that are communicatively coupled may include components capable of exchanging data signals with one another such as, for example, electrical signals via conductive medium, electromagnetic signals via air, optical signals via optical waveguides, and the like.

The system 102 includes one or more processors 132 communicatively coupled with one or more memory modules 134. The one or more processors 132 may include any device capable of executing machine-readable instructions stored on a non-transitory computer-readable medium. Accordingly, each processor may include a controller, an integrated circuit, a microchip, a computer, and/or any other computing device.

The one or more memory modules 134 are communicatively coupled to the one or more processors 132 over the communication path 104. The one or more memory modules 134 may be configured as volatile and/or nonvolatile memory and, as such, may include random access memory (including SRAM, DRAM, and/or other types of RAM), flash memory, secure digital (SD) memory, registers, compact discs (CD), digital versatile discs (DVD), and/or other types of non-transitory computer-readable mediums. Depending on the particular embodiment, these non-transitory computer-readable mediums may reside within the system 102 and/or external to the system 102. The one or more memory modules 134 may be configured to store one or more pieces of logic, as described in more detail below. The embodiments described herein may utilize a distributed computing arrangement to perform any portion of the logic described herein.

Embodiments of the present disclosure include logic that includes machine-readable instructions and/or an algorithm written in any programming language of any generation (e.g., 1GL, 2GL, 3GL, 4GL, and/or 5GL) such as, machine language that may be directly executed by the processor, assembly language, object-oriented programming (OOP), scripting languages, microcode, etc., that may be compiled or assembled into machine readable instructions and stored on a machine readable medium. Similarly, the logic and/or algorithm may be written in a hardware description language (HDL), such as logic implemented via either a field-programmable gate array (FPGA) configuration or an application-specific integrated circuit (ASIC), and their equivalents. Accordingly, the logic may be implemented in any conventional computer programming language, as pre-programmed hardware elements, and/or as a combination of hardware and software components.

The one or more memory modules 134 may store a variety of logic including, but not limited to, operating logic 242, vehicle drive mode detection logic 244a, message logic 244b, and mobile device detection logic 244c. The vehicle drive mode detection logic 244a, message logic 244b, and mobile device detection logic 244c may each include a plurality of different pieces of logic, each of which may be embodied as a computer program, firmware, and/or hardware, as an example.

The operating logic 242 may include an operating system and/or other software for managing components of the system 102. The vehicle drive mode detection logic 244a may be configured to cause the one or more processors 132 to detect the drive mode of the vehicle 100. For instance the one or more processors 132 may execute vehicle drive mode detection logic 244a to determine whether the vehicle 100 is in a driving mode or a non-driving mode. A driving mode may be considered any drive mode wherein the vehicle 100 is capable of immediate movement. Such driving modes may include, but are not limited to, drive and reverse. In some instances, such as for vehicles that have a manual drive train, neutral may also be considered a driving mode. Non-driving modes may therefore include park. In embodiments wherein the vehicle 100 is an autonomous vehicle, or wherein the vehicle 100 has an autonomous driving mode, such autonomous driving modes may be considered non-driving modes. An autonomous driving mode may include any driving mode wherein driver control is not needed to navigate the vehicle 100. For example, an auto-park vehicle feature may be considered an autonomous vehicle driving mode.

The message logic 244b may be configured to cause the one or more processors 132 to emit a disable or enable message with the network interface hardware 150 to the one or more mobile devices 166 located within the passenger cabin of the vehicle 100 to disable or enable one or more functions of the one or more mobile devices 166. The mobile device detection logic 244c may be configured to cause the processor to detect the one or more mobile devices 166 within the passenger cabin of the vehicle 100 by using one or more cellular signal sensors 110 to triangulate a position of the one or more mobile devices 166 within the passenger cabin 101, shown in FIG. 2, of the vehicle 100 based on a time stamp applied to the cellular signal detected by the one or more cellular signal sensors 110, as will be described in greater detail herein.

Additionally, while the system 102 is illustrated with the vehicle drive mode detection logic 244a, message logic 244b, and mobile device detection logic 244c as separate logical components, this is also an example. In some embodiments, a single piece of logic may cause the system 102 to provide the described functionality.

In some embodiments, the system 102 includes network interface hardware 150 for communicatively coupling the system 102 with the network 160, depicted in FIG. 1. The network interface hardware 150 can be communicatively coupled to the communication path 104 and can be any device capable of transmitting and/or receiving data via the network 160. Accordingly, the network interface hardware 150 can include a communication transceiver for sending and/or receiving any wired or wireless communication. For example, the network interface hardware 150 may include an antenna, a modem, LAN port, Wi-Fi card, WiMax card, mobile communications hardware, near-field communication hardware, satellite communication hardware and/or any wired or wireless hardware for communicating with other networks and/or devices. In one embodiment, network interface hardware 150 includes hardware configured to operate in accordance with the Bluetooth wireless communication protocol. In another embodiment, network interface hardware 150 may include a Bluetooth send/receive module for sending and receiving Bluetooth communications to/from the one or more mobile devices 166.

As described above, the system 102 may communicate, through the network interface hardware 150, with a network 160 to communicatively couple the system 102 with one or more mobile devices 166. In one embodiment, the network 160 is a personal area network that utilizes Bluetooth technology to communicatively couple the system 102 and the one or more mobile devices 166. In other embodiments, the network 160 may include one or more computer networks (e.g., a personal area network, a local area network, or a wide area network), cellular networks, satellite networks and/or a global positioning system and combinations thereof. Accordingly, the system 102 can be communicatively coupled to the network 160 via wires, via a wide area network, via a local area network, via a personal area network, via a cellular network, via a satellite network, etc. Suitable local area networks may include wired Ethernet and/or wireless technologies such as, for example, wireless fidelity (Wi-Fi). Suitable personal area networks may include wireless technologies such as, for example, IrDA, Bluetooth, Wireless USB, Z-Wave, ZigBee, and/or other near field communication protocols. Suitable personal area networks may similarly include wired computer buses such as, for example, USB and FireWire. Suitable cellular networks include, but are not limited to, technologies such as LTE, WiMAX, UMTS, CDMA, and GSM.

Still referring to FIG. 1, as stated above, the network 160 may be utilized to communicatively couple the system 102 with one or more mobile devices 166. The one or more mobile devices 166 may include one or more processors and one or more memory modules. The one or more processors 132 can execute logic to communicate with the system 102 in order to facilitate and receive the disabling/enabling messages from the system 102 to the one or more mobile devices 166 to disable or enable a function thereof. The mobile device 166 having received the enabling/disabling message from the system 102 may then execute logic to disable or enable the function. The one or more mobile devices 166 may be configured with wired and/or wireless communication functionality for communicating with the system 102.

In embodiments described herein, the one or more mobile devices 166 may include mobile phones, smartphones, personal digital assistants, dedicated mobile media players, mobile personal computers, laptop computers, and/or any other mobile devices capable of being communicatively coupled with the system 102. The mobile device 166 may be capable of a variety of functions including, but not limited to, placing and receiving telephone calls, text-messaging, email, internet browsing, games, and other applications. As described herein, the system 102 sends a disabling or enabling message with the network interface hardware 150 to the one or more mobile devices 166 to disable or enable at least one of such functions. In some embodiments, multiple functions may be disabled or enabled.

The one or more mobile devices 166 may also be capable of emitting a cellular signal. For instance, mobile devices 166 frequently emit cellular signals to communicate with cellular towers. These cellular signals may be unique cellular signals and may comprise unique identifiers that may be associated with distinct mobile devices 166. As will be explained in more detail herein, by providing sensors capable of detecting these unique cellular signals, the approximate location of the one or more mobile devices 166 within the vehicle 100 may be determined.

The system 102 may further include one or more occupant sensors 108 communicatively coupled to the one or more processors 132 along the communication path 104. The one or more occupant sensors 108 may be any sensor capable of detecting the presence of a passenger within the vehicle 100. For example, and not as a limitation, the one or more occupant sensors 108 may be weight sensors, seat sensors, seatbelt sensors, door sensors, and cameras. The one or more occupant sensors 108 may output an occupant sensor output signal indicative of the presence of an occupant of the vehicle 100. Based on the occupant sensor output signal output by the one or more occupant sensors 108, the one or more processors 132 of the system 102 may execute logic to determine the number of occupants present in the vehicle 100.

The system 102 may further include one or more driving mode sensors 112. The one or more driving mode sensors 112 may be configured to detect whether the vehicle 100 has been placed in a driving mode or a non-driving mode. As described herein, a driving mode may be considered any drive mode wherein the vehicle 100 is capable of immediate movement. Such driving modes may include, but are not limited to, drive and reverse. In some instances, such as for vehicles that have a manual drive train, neutral may also be considered a driving mode. Non-driving modes may therefore include park. In embodiments wherein the vehicle 100 is an autonomous vehicle, or wherein the vehicle 100 has an autonomous driving mode, such autonomous driving modes may be considered non-driving modes. In some embodiments, the one or more driving mode sensors 112 may be communicatively coupled with a gear shifter of the vehicle 100 and may output a driving mode sensor output signal indicative of the gear in which the vehicle 100 has been placed. As such, the one or more processors 132 may execute vehicle drive mode detection logic 244a to determine whether the vehicle 100 is in a driving mode. In other embodiments, the one or more driving mode sensors 112 may be a wheel sensor or an accelerometer, wherein the one or more driving mode sensors 112 output a driving mode sensor output signal indicative of whether the vehicle 100 is in motion. As such, the one or more processors 132 may execute vehicle drive mode detection logic 244a to determine that the vehicle 100 is in motion, and thus in a driving mode, based on the driving mode sensor output signal output one or more driving mode sensors 112.

As discussed above, the system 102 may further include one or more cellular signal sensors 110 communicatively coupled to the one or more processors 132 along the communication path 104. The one or more cellular signal sensors 110 are configured to detect the cellular signal emitted by the one or more mobile devices 166. The one or more cellular signal sensors 110 may then output a cellular signal sensor output signal indicative of the cellular signal to the system 102. Based on the cellular signal sensor output signal provided by one or more cellular signal sensors 110, the computing device may execute machine readable instructions to determine a location of the one or more mobile devices 166 within the vehicle 100. The one or more cellular signal sensors 110 may be any sensor capable of detecting a cellular signal emitted by a mobile device. The one or more cellular signal sensors 110 may comprise a variety of constructions. In one embodiment, the one or more cellular signal sensors 110 include a processor, an antenna communicatively coupled to the processor to detect the cellular signal emitted by the one or more mobile devices 166, and a memory communicatively coupled to the processor that stores logic that, when executed by the processor, causes the cellular signal sensor 110 to assign a time stamp to the cellular signal received from the mobile device 166. In other embodiments, the one or more cellular signal sensors 110 may only include an antenna which is communicatively coupled to the one or more processors 132 of the system 102, in which case the one or more processors 132 may execute mobile device detection logic 244c stored on the one or more memory modules 134 to assign a time stamp to the cellular signal detected by the one or more cellular signal sensors 110. Based on the time stamp applied to the cellular signal detected by the one or more cellular signal sensors 110, the system 102, may execute logic to triangulate the positions of the one or more mobile devices 166 within the vehicle 100.

Furthermore, it is noted that each mobile device 166 may have a unique identifier that is transmitted as part of the cellular signal. As such, the one or more processors 132, based on the cellular signal sensor output signal output by the one or more cellular signal sensors 110 may execute logic, stored on the one or more memory modules 134 to associate the particular cellular signal detected by the one or more cellular signal sensors 110 to the particular mobile device 166 having the unique identifier contained in the cellular signal. Therefore, the one or more processors 132, in executing message logic 244b, may selectively send disable or enable messages with the network interface hardware 150 over the network 160 to the one or more mobile devices 166 based on the unique identifier contained within the cellular signal and associated with each of the one or more mobile devices 166.

It should be understood that while the components in FIG. 1 are illustrated as residing within the system 102, this is merely an example. In some embodiments, one or more of the components may reside external to the system 102. It should also be understood that, while the system 102 in FIG. 1 is illustrated as a single device, this is also merely an example. In some embodiments, the operating logic 242, the vehicle drive mode detection logic 244a, the message logic 244b, and the mobile device detection logic 244c may reside on different computing devices.

Figure 2:
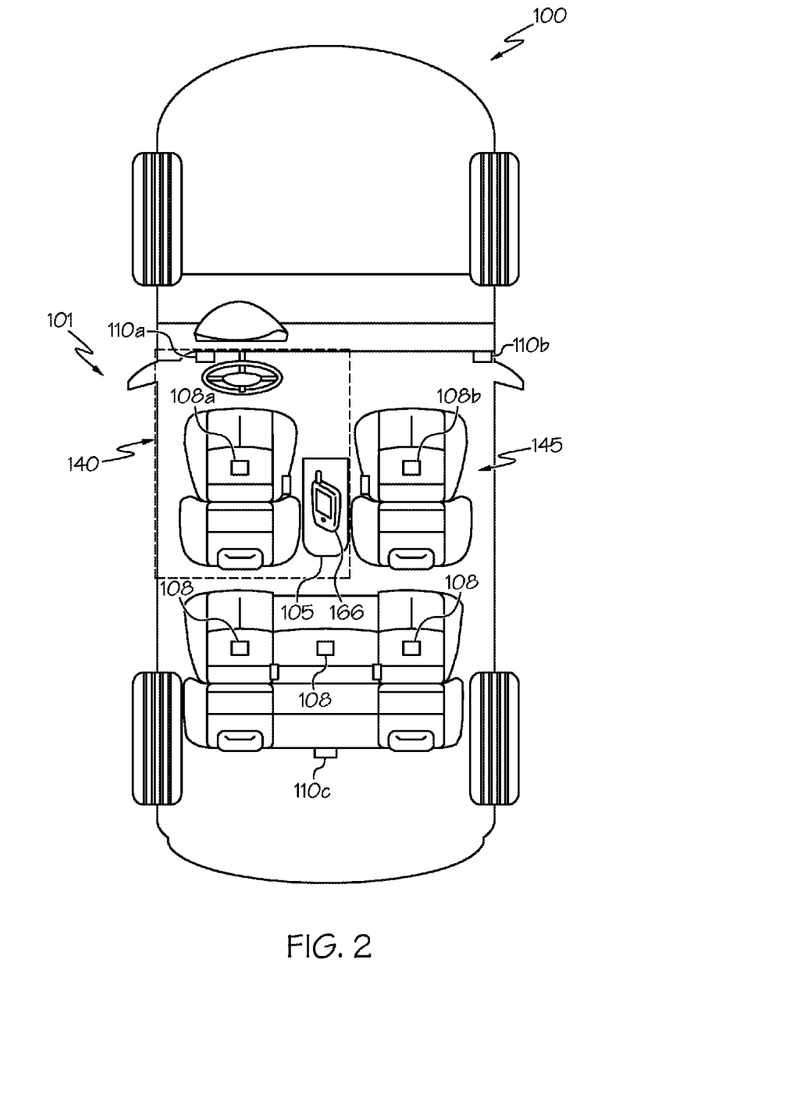
FIG. 2 schematically depicts the system of FIG. 1 as applied to an interior cabin of the vehicle, according to one or more embodiments shown and described herein.

FIG. 2 schematically depicts an example passenger cabin 101 including the system 102 from FIG. 1 as described herein. As will be described in greater detail, the system 102 may include two modes of operation: a driver-only mode, and a driver-plus-passenger mode. In the driver-only mode, the system 102 may disable a function of all of the one or more mobile devices 166 located within the passenger cabin 101 of the vehicle 100. In the driver-plus-passenger mode, the system 102 may only disable a function of the one or more mobile devices 166 located in particular regions of the passenger cabin 101. For example, FIG. 2 illustrates the passenger cabin 101 divided into a driver zone 140 and a passenger zone 145. In driver-plus-passenger mode, the function of the one or more mobile devices 166 located within the driver zone 140 of the vehicle 100 may be disabled. The driver zone 140 of the vehicle 100 may include areas accessible to the driver while driving (e.g. at least a portion of the center console 105, the dashboard, the driver's seat, and the driver's side door). As described above, it is noted that though the system 102 is described as disabling the function of the one or more mobile devices 166, it may be that only one or more functions are disabled and not all functions of the one or more mobile devices 166 are disabled. For example, and not as a limitation, text-messaging functions may be disabled while leaving other communication functions available to the driver (e.g., telephone use).

As described herein, to determine the number of occupants within the vehicle 100, the system 102 may include one or more occupant sensors 108. FIG. 2 illustrates the one or more occupant sensors 108 as seat and/or weight sensors. However, as described above, the one or more occupant sensors 108 may be any sensor capable of detecting the presence of a passenger including, but not limited to, weight sensors, seat sensors, seatbelt sensors, door sensors, and cameras. The one or more occupant sensors 108 may then output an occupant sensor output signal indicative of a number of occupants within the passenger cabin 101. The system 102, may then execute logic to determine the number of occupants present in the passenger cabin 101 based on the occupant sensor output signal output by the one or more occupant sensors 108, as will be described below.

The one or more cellular signal sensors 110, are illustrated as being located in three locations about the passenger cabin 101 of the vehicle 100 (e.g., the driver side cellular signal sensor 110a, the front passenger side cellular signal sensor 110b, and the rear center cellular signal sensor 110c). However, this illustration is for example only and is not intended to limit the number of cellular signal sensors 110 to any particular embodiment. For example, in some embodiments, there may only be one cellular signal sensor 110 and in other embodiments there may be many. In either case, the one or more cellular signal sensors 110 may each detect the cellular signals emitted by the one or more mobile devices 166. The one or more cellular signal sensors 110 or the one or more processors 132 of the system 102 may assign and store the time stamp to the cellular signal. Based on the time stamp, the one or more processors 132 of the system 102 may execute machine readable instructions to triangulate the position of the mobile device 166 emitting the cellular signal. As noted above, different mobile devices may emit unique cellular signals that have a unique identifier associated therewith. The time stamp will be associated with the unique identifier contained in the cellular signal of each mobile device 166 present in the passenger cabin 101 of the vehicle 100. Thus, it may be determined whether the mobile device 166 is located within the passenger zone 145 of the passenger cabin 101 or the driver zone 140. As an example, and not a limitation, FIG. 2 illustrates a driver side cellular signal sensor 110a, a front passenger side signal sensor 110b, and a rear center cellular signal sensor 110c, each of which are included in the one or more cellular signal sensors 110. If the driver side cellular signal sensor 110a were to detect a cellular signal at T1, and the front passenger side cellular signal sensor 110b were to detect the same cellular signal at T2, and the rear center cellular signal sensor 110c were to detect the same cellular signal at T3, wherein T1 is less than T2 and T3, then the system 102 may execute logic to determine that the mobile device 166 that produced that cellular signal is within the driver zone 140 of the passenger cabin 101, at least because the cellular signal was first detected by the driver side cellular signal sensor 110a.

Figure 3:
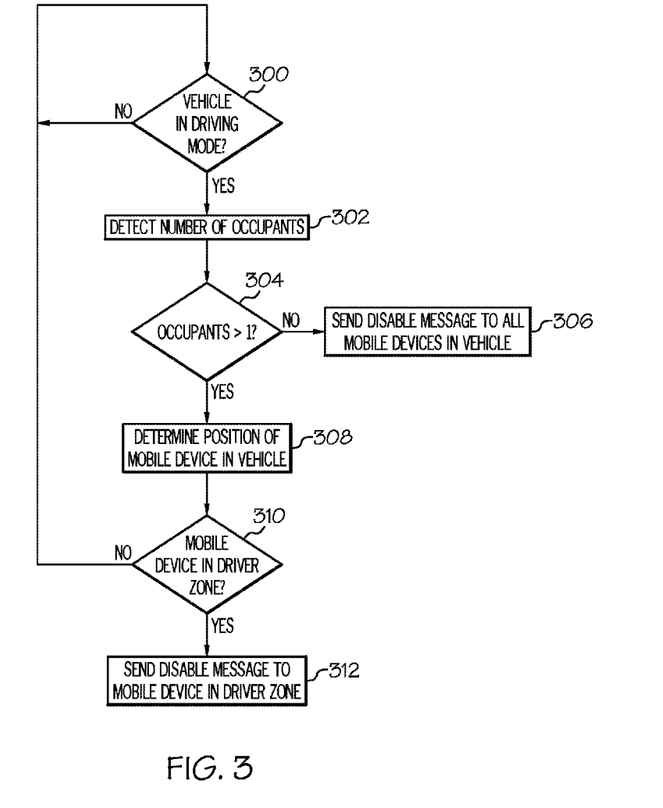
FIG. 3 depicts a flow chart for disabling a function of one or more mobile devices within a passenger cabin, according to one or more embodiments shown and described herein.

FIG. 3 depicts a flowchart for disabling a function of one or more mobile devices 166 within a passenger cabin 101 according to embodiments disclosed herein. Referring now to FIGS. 1-3, as illustrated in block 300, the system 102 may determine the vehicle drive mode based on the vehicle drive mode detection logic 244a stored on the one or more memory modules 134. As described above, in some embodiments, the one or more driving mode sensors 112 may be communicatively coupled with a gear shifter of the vehicle 100 and may output a driving mode sensor output signal indicative of the gear in which the vehicle 100 has been placed. As such, the one or more processors 132 may execute vehicle drive mode detection logic 244a to determine whether the vehicle 100 is in a driving mode based on the driving mode sensor output signal indicative of the gear in which the vehicle 100 has been placed. In other embodiments, also described herein, the one or more driving mode sensors 112 may be a wheel sensor or an accelerometer, wherein one or more driving mode sensors 112 outputs a driving mode sensor output signal indicative of whether the vehicle 100 is in motion. As such, the one or more processors 132 may execute vehicle drive mode detection logic 244a to determine that the vehicle 100 is in motion, and thus in a driving mode, based on the driving mode sensor output signal output indicative of the vehicle 100 being in motion.

In some embodiments, the system 102 will only disable a function of the one or more mobile devices 166 if the vehicle 100 is in a driving mode. As described above, a driving mode may be considered any drive mode wherein the vehicle 100 is capable of immediate movement. For example, the vehicle drive mode may include drive and reverse. The non-driving modes may include any mode of the vehicle 100 wherein the vehicle 100 is not capable of immediate movement or wherein the vehicle 100 is in an autonomous driving mode. As described above, an autonomous driving mode may include any driving mode wherein driver control is not needed to navigate the vehicle 100. For example, an auto-park vehicle feature may be considered an autonomous vehicle driving mode. If the vehicle 100 is not in a driving mode, or is in a non-driving mode, the system 102 may continuously or periodically check the drive mode of the vehicle 100 using the one or more driving mode sensors 112. While determining the drive mode of the vehicle 100 is listed first within the flowchart, it need not be the first step. Some embodiments may not rely on the drive mode of the vehicle 100 at all to disable a function of the one or more mobile devices 166. In further embodiments, if the drive mode of the vehicle 100 is changed from a driving mode to a non-driving mode, the system 102 may execute message logic 244b stored in the one or more memory modules 134 to emit an enable message with the network interface hardware 150 to enable to the previously disabled function of the one or more mobile devices 166.

As illustrated in block 302, the number of occupants is determined. Though this step is shown as occurring second, in some embodiments, determining the number of occupants may be the first step of the method. As discussed above, the number of occupants may be determined based on an occupant sensor output signal output by the one or more occupant sensors 108. For example, the one or more occupant sensors 108 are communicatively coupled to the one or more processors 132. The one or more occupant sensors 108, which may be any sensor configured to detect the presence of a passenger within a vehicle 100, such as weight sensors, seat sensors, seatbelt sensors, door sensors, and cameras, output an occupant sensor output signal indicative of the presence of an occupant within the passenger cabin 101 of the vehicle 100. The one or more processors 132, upon receiving the one or more occupant sensor output signals from the one or more occupant sensors 108 may execute logic stored on the one or more memory modules 134 to add up the number of occupants within the passenger cabin 101 and determine if the number of occupants is greater than one (Block 304).

As described above, in embodiments where only one occupant is detected (Block 306), the driver-only mode will cause the one or more processors 132 to execute message logic 244b to send a disable message with the network interface hardware 150 to the one or more mobile devices 166 within the passenger cabin 101 to disable the function of all mobile devices 166 located within the passenger cabin 101. As described above, the network 160 may be utilized to communicatively couple the system 102 with one or more mobile devices 166. The network 160 may be at least one of a Bluetooth network, a WiFi network, or a cellular network. The one or more mobile devices 166 may include one or more processors and one or more memory modules. The one or more processors can execute logic to communicate with the system 102 in order to facilitate and receive disabling/enabling messages from the system 102 to the one or more mobile devices 166 to disable or enable a function thereof. The mobile device 166 having received the enabling/disabling message from the system 102 may then execute logic to disable or enable the function.

However, in embodiments where more than one occupant is detected (Block 308), driver-plus-passenger mode will cause the one or more processors 132 to execute mobile device detection logic 244c to determine, with the cellular signal sensor output signal output by the one or more cellular signal sensors 110, the location of the one or more mobile devices 166 and only disable a function of the one or more mobile devices 166 if it is within the driver zone 140 of the passenger cabin 101 (Blocks 310 and 312). As described above in reference to FIG. 2, the one or more mobile devices 166 may emit unique cellular signals that include a unique identifier. The one or more cellular signal sensors 110 receive this unique cellular signal and unique identifier, and the one or more cellular signal sensors 110 or the one or more processors 132 of the system 102 may assign and store a time stamp associated with the unique identifier. Based on the time stamp, the one or more processors 132 of the system 102 may execute machine readable instructions to triangulate the position of the mobile device 166 associated with the unique identifier. Thus, it may be determined whether the mobile device 166 is located within the passenger zone 145 of the passenger cabin 101 or the driver zone 140. As an example, and not a limitation, if the driver side cellular signal sensor 110a were to detect a cellular signal at T1, and the front passenger side cellular signal sensor 110b were to detect the same cellular signal at T2, and the rear center cellular signal sensor 110c were to detect the same cellular signal at T3, wherein T1 is less than T2 and T3, then the system 102 may execute logic to determine that the mobile device 166 that produced that cellular signal is within the driver zone 140 of the passenger cabin 101, at least because the cellular signal was first detected by the driver side cellular signal sensor 110a.

Therefore, when more than one occupant is detected, and the location of the one or more mobile devices 166 are determined, as provided above, using the unique identifier associated with the one or more mobile devices 166, the one or more processors 132 may execute message logic 244b to send a disable message with the network interface hardware 150 to the one or more mobile devices 166 associated with the unique identifier to disable the function of the one or more mobile devices 166 associated with the unique identifier located within the driver zone 140 of the passenger cabin 101. As described above, the network 160 may be utilized to communicatively couple the system 102 with the particular mobile device 166 associated with the unique identifier. The network 160 may be at least one of a Bluetooth network, a WiFi network, or a cellular network. Furthermore, the one or more mobile devices 166 associated with the unique cellular signal may include one or more processors and one or more memory modules. The one or more processors of the one or more mobile devices 166 may execute logic to communicate with the system 102 in order to facilitate and receive disabling/enabling messages from the system 102 to the one or more mobile devices 166 to disable or enable a function thereof. The mobile device 166 having received the enabling/disabling message from the system 102 may then execute logic to disable or enable the function.

As described above, for the system 102 to communicate with the one or more mobile devices 166, the one or more mobile devices 166 may need to be linked to the system 102. As described herein, the system 102 is equipped with network interface hardware 150 that may communicate over the network 160. As described herein the system 102 may therefore be linked to the one or more mobile devices 166 through Bluetooth communication, WiFi communication, or cellular network communication. However, it should be understood that in other embodiments the system 102 may be linked to the one or more mobile devices 166 in any other manner that enables the system 102 and the one or more mobile devices 166 to communicate via network 160.

It is noted that in some embodiments, the one or more processors 132 of the system 102 may execute message logic 244b to send an enable message with the network interface hardware 150 to enable the function of the one or more mobile devices 166. For example, and not as a limitation, the system 102 may send an enable message with the network interface hardware 150 to enable the function of the one or more mobile devices 166 when the vehicle 100 is placed in a non-driving mode (such as park), or when, in driver-plus-passenger mode, the one or more mobile devices 166 pass out of the driver zone 140 and into the passenger zone 145. As such, in some embodiments, the system 102 may also periodically monitor the locations of the one or more mobile devices 166 with the one or more cellular signal sensors 110. Furthermore, when the one or more mobile devices 166 exit the vehicle 100, it will automatically be re-enabled.

Figure 4:
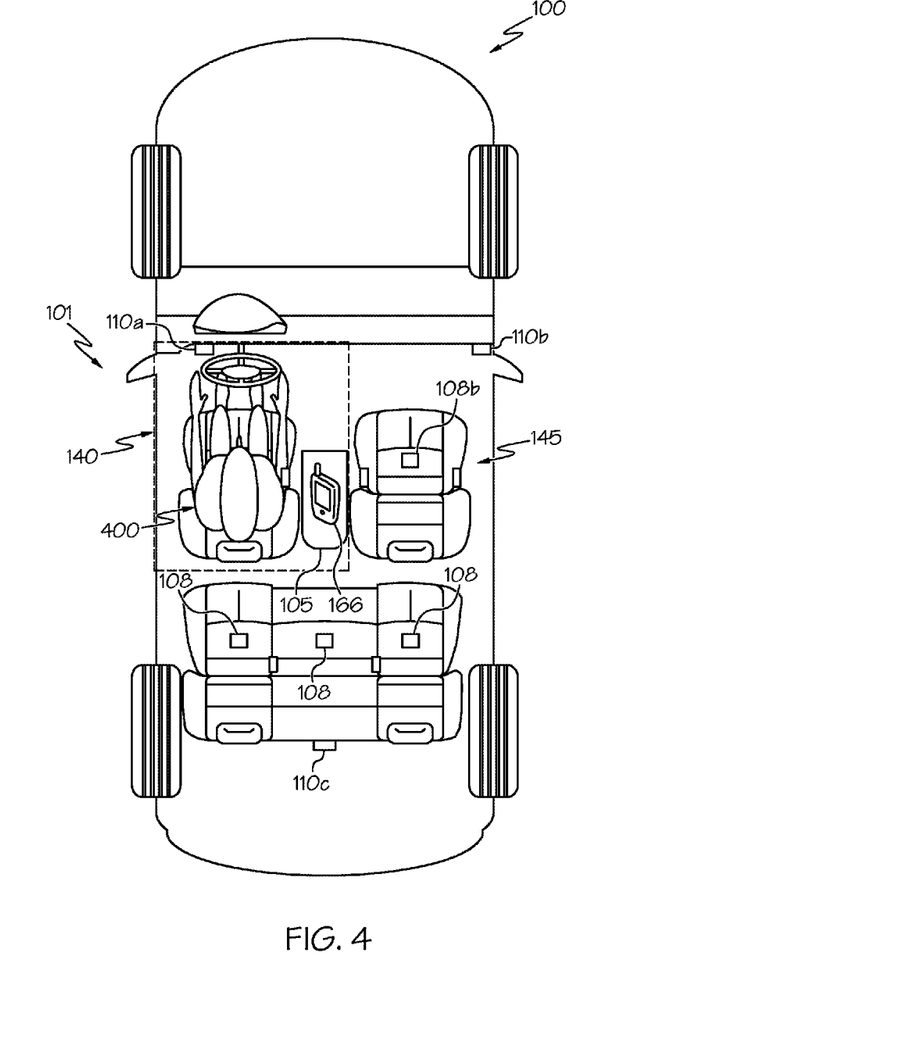
FIG. 4 schematically depicts the system of FIG. 1 functioning to disable a function of one or more mobile devices present within the passenger cabin, according to one or more embodiments shown and described herein.

Referring now to FIG. 4, the system 102 of FIG. 1 functioning to disable a mobile device 166 in driver-only mode is schematically depicted. As illustrated in FIG. 4, only a driver 400 is located within the passenger cabin 101 of the vehicle 100. The one or more mobile devices 166 are communicatively linked to the system 102 via the network 160. Assuming the system 102 has determined that the vehicle 100 is in a driving mode, as provided herein, or this embodiment does not require that the vehicle 100 be in a driving mode, the system 102 may determine the number of occupants within the vehicle 100. As described herein, the one or more occupant sensors 108, specifically the driver seat occupant sensor 108a (which is included in the one or more occupant sensors 108), as shown in FIG. 2, would emit an occupant sensor output signal to indicate that an occupant is within the vehicle 100, or more specifically, that an occupant is within the driver's seat. The other occupant sensors 108 in this case would not output a signal indicative of occupancy. Based on the signal received from the one or more occupant sensors 108, the one or more processors 132 may execute logic to add up the number of occupants sensed, in this case, one. Because the number of occupants would not be determined to be greater than one, the driver-only mode would cause the system 102, via the network 160, to send a disable message with the network interface hardware 150, regardless of the location of the one or more mobile devices 166 within the vehicle 100, over the network 160 to the one or more mobile devices 166 to disable one or more functions of the one or more mobile devices 166 linked to the system 102.

As discussed above, only certain functions may be disabled while other functions may remain available to the driver 400. For example, functions requiring a keypad/keyboard, such as text-messaging, email, and dialing, may be disabled. However, the driver may still receive phone calls on the one or more mobile devices 166. Furthermore, when the vehicle 100 is placed in a non-driving mode, the system 102 may send an enable message with the network interface hardware 150 over the network 160 to re-enable the previously disabled function of the one or more mobile devices 166.

Figure 5:
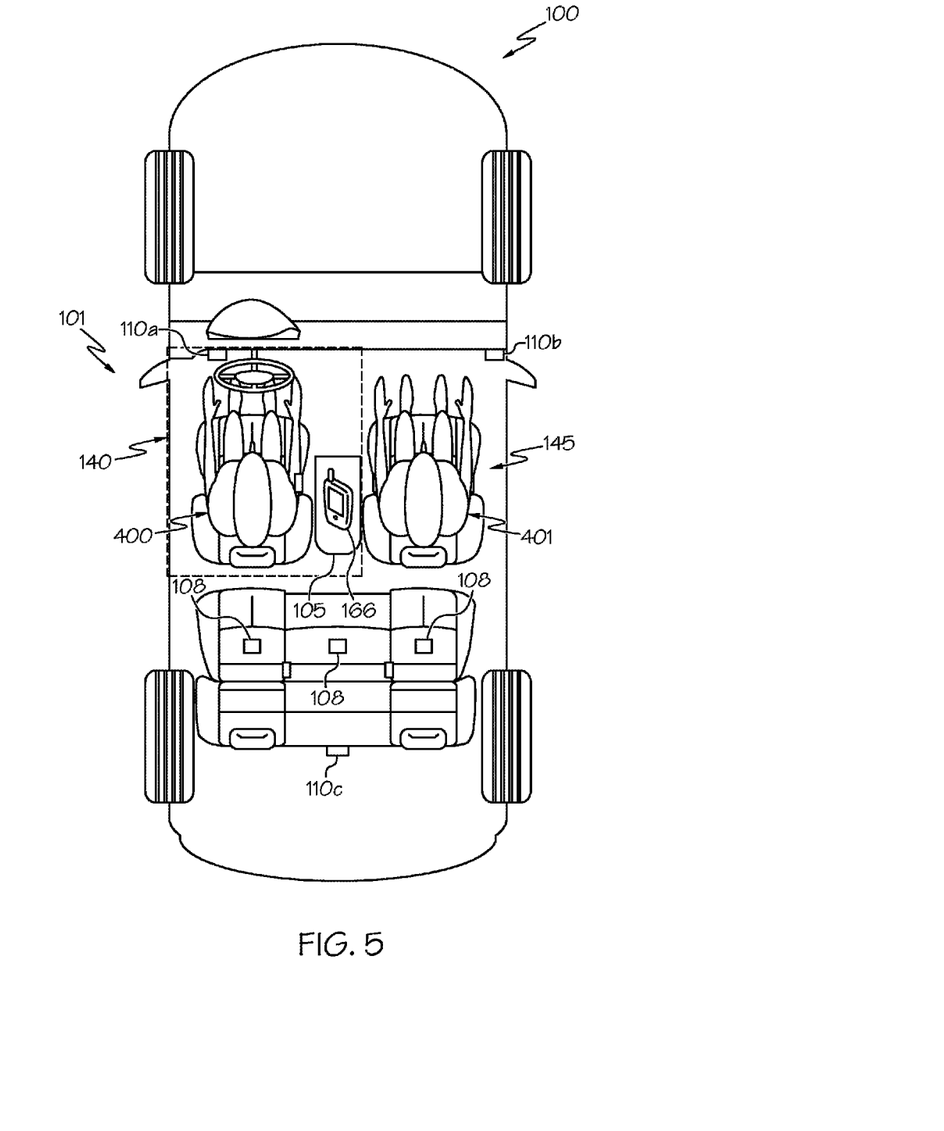
FIG. 5 schematically depicts the system of FIG. 1 functioning to disable a function of one or more mobile devices present within the passenger cabin, according to one or more embodiments shown and described herein.

Referring now to FIG. 5, the system 102 of FIG. 1 functioning to disable a mobile device 166 in driver-plus-passenger mode is schematically depicted. As illustrated in FIG. 5, a driver 400 and passenger 401 are seated within the vehicle 100. The one or more mobile devices 166 are communicatively linked to the system 102 via the network 160. The system 102, based on the occupant sensor output signal provided by the one or more occupant sensors 108, would thus determine the number of occupants within the vehicle 100. As described herein, the one or more occupant sensors 108, specifically the driver seat occupant sensor 108a and the front passenger occupant sensor 108b (which are included in the one or more occupant sensors 108), as shown in FIG. 2, would emit occupant sensor output signals to indicate that an occupant is within the driver's seat and an occupant is within the front passenger seat. The remaining occupant sensors 108 would not, in this case, emit an occupant sensor output signal. Based on the signals received from the one or more occupant sensors 108, the one or more processors 132 may execute logic to add up the number of occupants sensed, in this case, two.

Because the number of occupants would be determined to be greater than one, the driver-plus-passenger mode would cause the system 102 to determine the location of the one or more mobile devices 166 within the passenger cabin 101 of the vehicle 100. As described above in reference to FIG. 2, the one or more mobile devices 166 may emit unique cellular signals that include unique identifiers. The one or more cellular signal sensors 110 receive this unique cellular signal, and the one or more cellular signal sensors 110 or the one or more processors 132 of the system 102 may assign and store a time stamp associated with the unique identifier. Based on the time stamp, the one or more processors 132 of the system 102 may execute machine readable instructions to triangulate the position of the mobile device 166 associated with the unique identifier. Thus, it may be determined whether the mobile device 166 is located within the passenger zone 145 of the passenger cabin 101 or the driver zone 140. In this example, the driver side cellular signal sensor 110*a* would detect the unique cellular signal of the mobile device 166 at T1, and the front passenger side cellular signal sensor 110*b* would detect the unique cellular signal of the mobile device 166 at T2, and the rear center signal sensor 110*c* would detect the unique cellular signal of the mobile device 166 at T3, wherein T1, because the mobile device 166 is located on the center console 105, would be less than or equal to T2 and T3, then the system 102 may execute logic to determine that the mobile device 166 that produced that cellular signal is within the driver zone 140 of the passenger cabin 101. Assuming the system 102 has determined that the vehicle 100 is in a driving mode, or that this embodiment does not require that the vehicle 100 be in a driving mode, the system 102 via the network 160 would send a disable message with the network interface hardware 150, to only the one or more mobile devices 166 located within the driver zone 140 of the passenger cabin 101 based on the unique identifier associated with the mobile device 166.

The system 102 may then monitor the position of the one or more mobile devices 166 within the vehicle 100 and send an enable message with the network interface hardware 150 to the one or more mobile devices 166, should the one or more mobile devices 166 pass out of the driver zone 140 of the passenger cabin 101. For example, the one or more cellular signal sensors 110 may continue to detect the unique cellular signals emitted by the one or more mobile devices 166. Based on the time stamp applied to the unique cellular signal, the one or more processors 132 may triangulate the position of the one or more mobile devices 166 periodically. If it is determined that the one or more mobile devices 166 have passed outside of the driver zone 140 and into the passenger zone 145 of the passenger cabin 101, the one or more processors 132 may execute logic to send an enable message with the network interface hardware 150 to the one or more mobile devices 166 now within the passenger zone 145 based on the unique identifier associated with the one or more mobile devices 166. Furthermore, regardless of the location of the one or more mobile devices 166 within the vehicle 100, when the vehicle 100 is placed in a non-driving mode, the system 102 may send an enable message with the network interface hardware 150 over the network 160 to re-enable the previously disabled function of the one or more mobile devices 166.

It should be understood that embodiments described herein provide for methods, systems, and vehicles for disabling one or more functions of a mobile device. The methods, systems and vehicles described herein may disable one or more functions of the mobile device through either a driver-only mode or a driver-plus-passenger mode. In the driver-only mode, one or more functions of all mobile devices located within the vehicle may be disabled. In the driver-plus-passenger mode, only one or more functions of those cellular phones associated with the driver, by being located within the driver zone of the vehicle may be disabled. Thus, the driver of the vehicle may be substantially prevented from utilizing one or more functions of a mobile device while driving the vehicle.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed:

1. A method of disabling a function of a mobile device within a passenger cabin of a vehicle comprising:
    determining a number of occupants within the passenger cabin based on one or more occupant sensor output signals output by one or more occupant sensors;
    determining a location of the mobile device within the passenger cabin in response to determining that the number of occupants present in the passenger cabin is greater than one based on the one or more occupant sensor output signals output by one or more occupant sensors; and
    sending a disable message to disable a function of the mobile device when the mobile device is in the location and the number of occupants present in the passenger cabin is determined to be greater than one.

2. The method of claim 1, wherein the location is a driver zone of the passenger cabin.

3. The method of claim 1, further comprising: periodically monitoring the location of the mobile device in the passenger cabin, wherein the disable message is sent to disable the function of the mobile device when the location of the mobile device is determined to be in a driver zone of the passenger cabin.

4. The method of claim 1, wherein the disable message is sent to the mobile device through at least one of Bluetooth communication, WiFi communication, and cellular network communication.

5. The method of claim 1, wherein the disable message is sent when the vehicle is placed in a driving mode.

6. The method of claim 1, further comprising sending an enable message to enable the function of the mobile device when the vehicle is in a non-driving mode.

7. A system for disabling a function of a mobile device within a passenger cabin of a vehicle, the system comprising:
    one or more processors;
    one or more occupant sensors communicatively coupled to the one or more processors;
    network interface hardware communicatively coupled to the one or more processors; and
    one or more memory modules communicatively coupled to the one or more processors that stores logic that, when executed by the one or more processors, cause the system to:
        determine a number of occupants within the passenger cabin based on one or more occupant sensor output signals output by the one or more occupant sensors;
        determine a location of the mobile device within the passenger cabin in response to determining that the number of occupants present in the passenger cabin is greater than one based on the one or more occupant sensor output signals output by one or more occupant sensors; and
        send a disable message with the network interface hardware to disable a function of the mobile device when the mobile device is in the location and the number of occupants present in the passenger cabin is determined to be greater than one.

8. The system of claim 7, further comprising one or more cellular signal sensors communicatively coupled to the one or more processors to provide one or more cellular signal sensor output signals indicative of a cellular signal emitted by the mobile device.

9. The system of claim 8, wherein at least one of the one or more cellular signal sensors comprises:
a processor;
an antenna communicatively coupled to the processor for detecting the cellular signal emitted by the mobile device; and
a memory communicatively coupled to the processor that stores logic that, when executed by the processor, causes at least one of the one or more cellular signal sensors to assign a time stamp to the cellular signal received from the mobile device.

10. The system of claim 7, wherein:
the system executes logic to determine a vehicle drive mode;
the vehicle drive mode comprises one or more driving modes and one or more non-driving modes; and
the system sends the disable message with the network interface hardware to disable the function of the mobile device when the vehicle is placed in one of the one or more driving modes.

11. The system of claim 10, wherein the system sends an enable message with the network interface hardware to enable the function of the mobile device when the vehicle is placed in one of the one or more non-driving modes.

12. The system of claim 11, wherein the one or more non-driving modes comprises an autonomous vehicle driving mode.

13. The system of claim 7, wherein the system sends the disable message with the network interface hardware to the mobile device through at least one of Bluetooth communication, WiFi communication, and cellular network communication.

14. A vehicle configured to disable a function of a mobile device comprising:
a passenger cabin comprising a driver zone and a passenger zone;
one or more processors;
one or more occupant sensors communicatively coupled to the one or more processors;
one or more cellular signal sensors communicatively coupled to the one or more processors;
network interface hardware communicatively coupled to the one or more processors; and
one or more memory modules communicatively coupled to the one or more processors that stores logic that, when executed by the one or more processors, cause the vehicle to:
determine a number of occupants within the passenger cabin based on one or more occupant sensor output signals output by the one or more occupant sensors;
determine a location of the mobile device within the passenger cabin based on one or more cellular signal sensor output signals output by the one or more cellular signal sensors in response to determining that the number of occupants present in the passenger cabin is greater than one based on the one or more occupant sensor output signals output by one or more occupant sensors; and
send a disable message with the network interface hardware to disable a function of the mobile device when the mobile device is in the location and the number of occupants present in the passenger cabin is determined to be greater than one.

15. The vehicle of claim 14, wherein the driver zone comprises at least a driver's seat and at least a portion of a center console.

16. The vehicle of claim 14, wherein the one or more processors further causes the vehicle to periodically monitor the location of the mobile device in the passenger cabin, wherein the disable message is sent to disable the function of the mobile device when the location of the mobile device is determined to be in the driver zone of the passenger cabin.

17. The vehicle of claim 14, wherein the one or more cellular signal sensors comprise:
a processor;
an antenna communicatively coupled to the processor to detect a cellular signal emitted by the mobile device; and
a memory communicatively coupled to the processor that stores logic that, when executed by the processor, causes the one or more cellular signal sensors to assign a time stamp to the cellular signal received from the mobile device.

18. The vehicle of claim 14 further comprising a vehicle drive mode wherein:
the vehicle drive mode comprises one or more driving modes and one or more non-driving modes;
the vehicle executes logic to determine the vehicle drive mode; and
the vehicle sends the disable message with the network interface hardware to disable the function of the mobile device when the vehicle is placed in one of the one or more driving modes.

19. The vehicle of claim 14, wherein the one or more occupant sensors comprise at least one of seat sensors, weight sensors, seat belt sensors, door sensors, and cameras.

20. The method of claim 1, further comprising sending the disable message to disable a function of the mobile device in the passenger cabin when the number of occupants present in the passenger cabin is determined to be one.

21. The system of claim 7, wherein logic executed by the one or more processors further cause the system to send the disable message with the network interface hardware to disable a function of the mobile device in the passenger cabin when the number of occupants present in the passenger cabin is determined to be one.

22. The vehicle of claim 14, wherein logic executed by the one or more processors further cause the vehicle to send the disable message with the network interface hardware to disable a function of the mobile device in the passenger cabin when the number of occupants present in the passenger cabin is determined to be one.

23. The method of claim 1, further comprising:
determining that the vehicle is in a driver-only mode in response to determining that the number of occupants present in the passenger cabin is not greater than one;
in response to determining that the vehicle is in the driver-only mode:
determining whether a number of mobile devices within the passenger cabin is more than one based on cellular signals from the mobile devices; and
sending the disable message to disable a function of all of the mobile devices within the passenger cabin in response to determining that the number of mobile devices is more than one;
determining that the vehicle is in a driver-plus-passenger mode in response to determining that the number of occupants present in the passenger cabin is greater than one; and
determining the location of the mobile device in response to determining that the vehicle is in the driver-plus-passenger mode.

24. The system of claim 7, wherein logic executed by the one or more processors further cause the system to:
    determine that the vehicle is in a driver-only mode in response to determining that the number of occupants present in the passenger cabin is not greater than one;
    in response to determining that the vehicle is in the driver-only mode:
        determine whether a number of mobile devices within the passenger cabin is more than one based on cellular signals from the mobile devices; and
        send the disable message to disable a function of all of the mobile devices within the passenger cabin in response to determining that the number of mobile devices is more than one;
    determine that the vehicle is in a driver-plus-passenger mode in response to determining that the number of occupants present in the passenger cabin is greater than one; and
    determine the location of the mobile device in response to determining that the vehicle is in the driver-plus-passenger mode.

25. The vehicle of claim 14, wherein logic executed by the one or more processors further cause the vehicle to:
    determine that the vehicle is in a driver-only mode in response to determining that the number of occupants present in the passenger cabin is not greater than one;
    in response to determining that the vehicle is in the driver-only mode:
        determine whether a number of mobile devices within the passenger cabin is more than one based on cellular signals from the mobile devices; and
        send the disable message to disable a function of all of the mobile devices within the passenger cabin in response to determining that the number of mobile devices is more than one;
    determine that the vehicle is in a driver-plus-passenger mode in response to determining that the number of occupants present in the passenger cabin is greater than one; and
    determine the location of the mobile device in response to determining that the vehicle is in the driver-plus-passenger mode.

\* \* \* \* \*